United States Patent
Hayashi

(10) Patent No.: US 7,856,625 B2
(45) Date of Patent: Dec. 21, 2010

(54) PROGRAM CONVERSION DEVICE AND METHOD

(75) Inventor: Kunihiko Hayashi, Osaka (JP)

(73) Assignee: Panasonic Corporation, Osaka (JP)

( * ) Notice: Subject to any disclaimer, the term of this patent is extended or adjusted under 35 U.S.C. 154(b) by 1256 days.

(21) Appl. No.: 11/254,850

(22) Filed: Oct. 21, 2005

(65) Prior Publication Data
US 2006/0101430 A1  May 11, 2006

(30) Foreign Application Priority Data
Oct. 27, 2004  (JP) .............. 2004-311628

(51) Int. Cl.
G06F 9/45 (2006.01)
G06F 9/46 (2006.01)

(52) U.S. Cl. ............... 717/149; 717/119; 717/154; 717/161; 718/102

(58) Field of Classification Search ............ None
See application file for complete search history.

(56) References Cited

U.S. PATENT DOCUMENTS

| | | | | |
|---|---|---|---|---|
| 5,151,991 A | * | 9/1992 | Iwasawa et al. ........ | 717/150 |
| 5,418,953 A | | 5/1995 | Hunt et al. | |
| 5,524,242 A | | 6/1996 | Aida et al. | |
| 5,628,013 A | * | 5/1997 | Anderson et al. ........ | 718/107 |
| 2001/0003187 A1 | * | 6/2001 | Aoki et al. ............. | 709/102 |
| 2004/0181791 A1 | | 9/2004 | Hayashi ................. | 718/100 |
| 2006/0005194 A1 | * | 1/2006 | Kawahara et al. ........ | 718/100 |

FOREIGN PATENT DOCUMENTS

| | | |
|---|---|---|
| JP | 05-081038 | 4/1993 |
| JP | 06250988 A | 9/1994 |
| JP | 07-056723 | 3/1995 |
| JP | 2004094581 A | 3/2004 |

* cited by examiner

*Primary Examiner*—Michael J Yigdall
(74) *Attorney, Agent, or Firm*—Steptoe & Johnson LLP

(57) ABSTRACT

A program conversion device for converting a program source is provided. The program conversion device comprises: a section and index acquisition device for acquiring a section code for indicating a section embedded in the program and performance index information embedded in the program in association with the section code; a task code conversion device for separating the acquired section code into task codes and adding a code to indicate the beginning of the task and a code to indicate the end of the task; and a task index attachment device for attaching a performance index, to input to the scheduler, to the task.

12 Claims, 17 Drawing Sheets

F I G. 2

```
#pragma _PERFORM(100)
{
        /*
         * PERFORMANCE ASSURANCE CODE
         */
}
```

FIG. 3A
BEFORE CONVERSION

```
func()
{
    /* CODE X */
    #pragma _PERFORM(100)
    {                                           ←— 41
        /*
         * PERFORMANCE ASSURANCE CORD
         */
    }
    /* CODE Y */
}
```

FIG. 3B
AFTER CONVERSION

```
func()
{
    /* CODE X */                                                42
    {
        // SAVE AUTOMATIC VERIABLE(1)           ←— 42a
        cur_time += _QTM_;                      ←— 42b
        if (cur_time > max_time) {              ←— 42c
            // ERROR PROCESSING
        }
        else {
            task_attr_init(&attr);              ←— 42d
            task_attr_setquantum(&attr,_QTM_)   ←— 42e
            task_create(&t,&attr,_newf);        ←— 42f
            task_join(t);                       ←— 42g
        }
        cur_time -= _QTM_;                      ←— 42h
        // RETURN AUTOMATIC VARIABLE(2)         ←— 42i
    }
    /* CODE Y */
}
```

FIG. 3C
AFTER CONVERSION

```
    45
_newf()                       43
{
    // RETURN AUTOMATIC VERIABLE(1)    ←— 43a
    {
        /*
         * PERFOMANCE ASSURANCE CODE         41
         */
    }                                        44
    // SAVE AUTOMATIC VARIABLE(2)      ←— 44a
    task_exit();                       ←— 44b
}
```

F I G. 6

```
#define _QTM_          (100)/cpu_freq*max_time    ←— 61a
extern unisnged int    cpu_freq;                  ←— 61b
extern unsigned_int    max_time;                  ←— 61c
extern unsigned_int    cur_time;                  ←— 61d
```
                                                             61

FIG. 7A
BEFORE CONVERSION

```
func()
{
    /* CODE X */
    #pragma _PERFORM(100)
    {
        /*
         * PERFORMANCE ASSURANCE CODE
         */
    }                                           81
    /* CODE Y */
}
```

FIG. 7B
BEFORE CONVERSION

```
func()
{
    /* CODE X */
    SYSCALL INSTRUCTION(_QTM_);                 82
    {
        /*
         * PERFORMANCE ASSURANCE CODE
         */
    }                                           81
    SYSCALL INSTRUCTION(-1)                     83
    /* CODE Y */
}
```

FIG. 9

```
#pragma _PERFORM(100,S)
{
    /*
     * PERFORMANCE ASSURANCE CODE (A)
     */
}
#pragma _PERFORM(200,S)
{
    /*
     * PERFORMANCE ASSURANCE CODE (B)
     */
}
#pragma _PERFORM(0,S)
{
    /*
     * NORMAL CODE (C)
     */
}
```

FIG. 10A
BEFORE CONVERSION

```
func()
{
    /* CODE X */
    #pragma _PERFORM(100,S)
    {
        /*PERFORMANCE ASSURANCE CODE (A)*/         101
    }
    #pragma _PERFORM(200,S)
    {
        /*PERFORMANCE ASSURANCE CODE (B)*/         102
    }
    #pragma _PERFORM(0,S)
    {
        /*NORMAL CODE (C)*/                        103
    }
    /* CODE Y */
}
```

FIG. 10B
BEFORE CONVERSION

```
func()
{
    /* CODE X */
    {                                                      104
        cur_time += _QTMA_ + _QTMB_;
        if (cur_time > max_time) {
                // ERROR PROCESSING              ← 104a
        }                                         ← 104b
        else {
                task_attr_init(&attr);
                task_attr_setquantum(&attr,_QTMA_) ← 104c
                                                  ← 104d
                task_create(&ta,&attr,_newfa);    ← 104e
                task_attr_setquantum(&attr,_QTMB_)← 104f task_create(&tb,&attr,_newfb);
                {                                 ← 104g
                    /*NORMAL CODE*/        103
                }
                task_join(ta);                    ← 104h
                task_join(tb);
        }                                         ← 104i
        cur_time -= _QTMA_ + _QTMB_;
    }
    /* CODE Y */
}
```

FIG. 10C
BEFORE CONVERSION

```
_newfa()                106
{
    {
        /*PERFORMANCE ASSURANCE CODE A */     101
    }
    task_exit();                              105
}
```

PROGRAM CONVERSION DEVICE AND METHOD

BACKGROUND OF THE INVENTION

1. Field of the Invention

The present invention relates to a program conversion device and method for automatically converting a given program, and more particularly to a program conversion device and method which allow automatically converting a program so as to insure performance in a selected section.

2. Description of the Related Art

The major functions of an operating system are hardware management, task management, data management and input/output management. Task management in particular is for managing the execution sequence of tasks, and plays an important role to operate the CPU, memory and input/output devices efficiently.

A task is a control unit for batch managing a flow of a program, such as startup, execution and end. A program which operates under the management of the operating system is handled as a task, and all the operations of the operating system related to the execution of a program are handled as tasks. In the case of describing a task as a program in prior art, it is necessary to explicitly describe the startup and the end of a task.

In terms of parallel processing, a method for performing parallel execution by automatically detecting the processing units which can be executed in parallel automatically and separating it into tasks to perform parallel execution by analyzing the control structure of the program and the dependency relationship of the data is known (e.g. JP-A-6-250988).

Or a method of performing parallel execution by designating a parallel compiler instruction statement for defining an area where parallel processing is possible, instead of designating task separation, so that this portion is automatically separated into tasks, is known (e.g. JP-A-2004-94581).

In these conventional methods, task separation is explicitly described or task separation is performed by automatically detecting the parallel execution portion. An object of these methods is to improve the average processing performance by parallel execution.

In the case of parallel execution in the media processing execution environment, it is more important to insure processing performance rather than to improve average processing performance. In this environment where various processings are executed simultaneously, it is difficult to set the relative priority of the processings.

SUMMARY OF THE INVENTION

To solve the above problem, it is an object of the present invention to provide a program conversion device and method which can automatically separate a specified section of a program into a task by attaching a performance index to the section.

To achieve the above object, a program conversion device for converting a program source according to the present invention comprises: a section and index acquisition device for acquiring a section code for indicating a section embedded in a program and performance index information embedded in the program in association with the section code; a task code conversion device for separating the acquired section code as a task code and adding a code to indicate the beginning of the task and a code to indicate the end of the task; and a task index attachment device for attaching a performance index, to input to the scheduler, to the task.

According to the present invention, it is preferable that the task code conversion device adds a task start code as a code to indicate the beginning of the task, and attaches a task end code as a code to indicate the end of the task.

According to the present invention, it is preferable that the task code conversion device adds a specific instruction of the processor as codes to indicate the beginning of the task and the end of the task.

According to the present invention, it is preferable that the task code conversion device adds a task generation code and also adds to the task generation code a code to operate such that an error is output when the program cannot be started up for the task generation code according to the attached index.

According to the present invention, it is preferable that the performance index information is a performance value to indicate the number of instructions that can be processed within a unit time.

According to the present invention, it is preferable that the performance index information is a value to indicate a ratio to the maximum performance value that can be processed.

According to the present invention, it is preferable that the task code conversion device detects whether a variable is reused or not at the boundary of a section code start point and at the boundary of a section code end point, and when the variable is reused, attaches a code to transfer the variable, from the code before starting the task to the separated task code, and to transfer the variable, from the code before ending the separated task code to the code after the task ends.

According to the present invention, it is preferable that the section and index acquisition device acquires the performance index information along with a code to indicate a group, and the task code conversion device adds a task generation code for generating tasks in parallel when section codes, having a same section code to indicate a group, are detected, and it is judged that the section codes do not have a dependency relationship.

A scheduler for controlling the execution sequence of programs according to the present invention, comprising: a task performance index input device for inputting a task performance index from a task when a task generation code is detected; a scheduling device for scheduling all tasks according to the task performance index; and a task switching device in which the time required for allocating the task performance index to the execution of processing is set as the processing time, and the execution is switched to another processing task when the processing time elapses.

According to the present invention, it is preferable that the scheduling device starts or ends scheduling when the processor decodes a specific instruction.

A program development tool according to the present invention comprises: a program acceptance device for accepting a program from the outside; a program display device for displaying an accepted program; a user information input device for receiving a section of the program displayed by the program display device and performance index information in association with this section, as input; and the above mentioned program conversion device for separating the program into tasks having performance index information based on the program accepted by the program acceptance device and a section of the program received by the user information input device and the performance index information in association with the section.

An information processing device according to the present invention comprises: a program code including a program converted into tasks attached with the performance index by the above mentioned program conversion device; a memory for storing the above mentioned scheduler, and a processor for processing the program code and the scheduler.

A program conversion method for converting a program source according to the present invention comprises: a section and index acquisition step for acquiring a section code for indicating a section embedded in the program, and performance index information embedded in the program in association with the section code; a task code conversion step for separating the acquired section code into task codes and adding a code to indicate the beginning of the task and a code to indicate the end of the task; and a task index attachment step for attaching a performance index, to input to the scheduler, to the task.

A program conversion software for converting a program source according to the present invention executes: a section and index acquisition step for acquiring a section code for indicating a section embedded in the program and performance index information embedded in the program in association with the section code; a task code conversion step for separating the acquired section code into task codes and adding a code to indicate the beginning of the task and a code to indicate the end of the task; and a task index attachment step for attaching a performance index, to input to the scheduler, to the task.

A storage medium according to the present invention is for recording the program conversion software.

According to the present invention, the program operates as an independent task when specified section of the program is executed, and by allocating time based on the performance index of the task using the scheduler, performance in the specified section can be assured without affecting other processing.

BRIEF DESCRIPTION OF THE DRAWINGS

FIG. 2 shows an example of the program before being converted by the program conversion device in FIG. 1;

FIG. 3A-FIG. 3C show an example of the program in the result of being converted by the task code conversion device in the program conversion device in FIG. 1;

FIG. 6 shows an example of the program in the result of being converted by the task index attachment device in the program conversion device in FIG. 1;

FIG. 7A and FIG. 7B show an example of the program in the result of being converted by the task code conversion device according to the second embodiment in the program conversion device of the present invention;

FIG. 9 shows another example of the program before being converted by the program conversion device in FIG. 1;

FIG. 10A-FIG. 10C show an example of the program in the result of being converted by the task code conversion device according to the third embodiment of the program conversion device of the present invention;

DESCRIPTION OF THE PREFERRED EMBODIMENTS

First Embodiment

The first embodiment of the program conversion device of the present invention will now be described with reference to the drawings.

Figure 1:
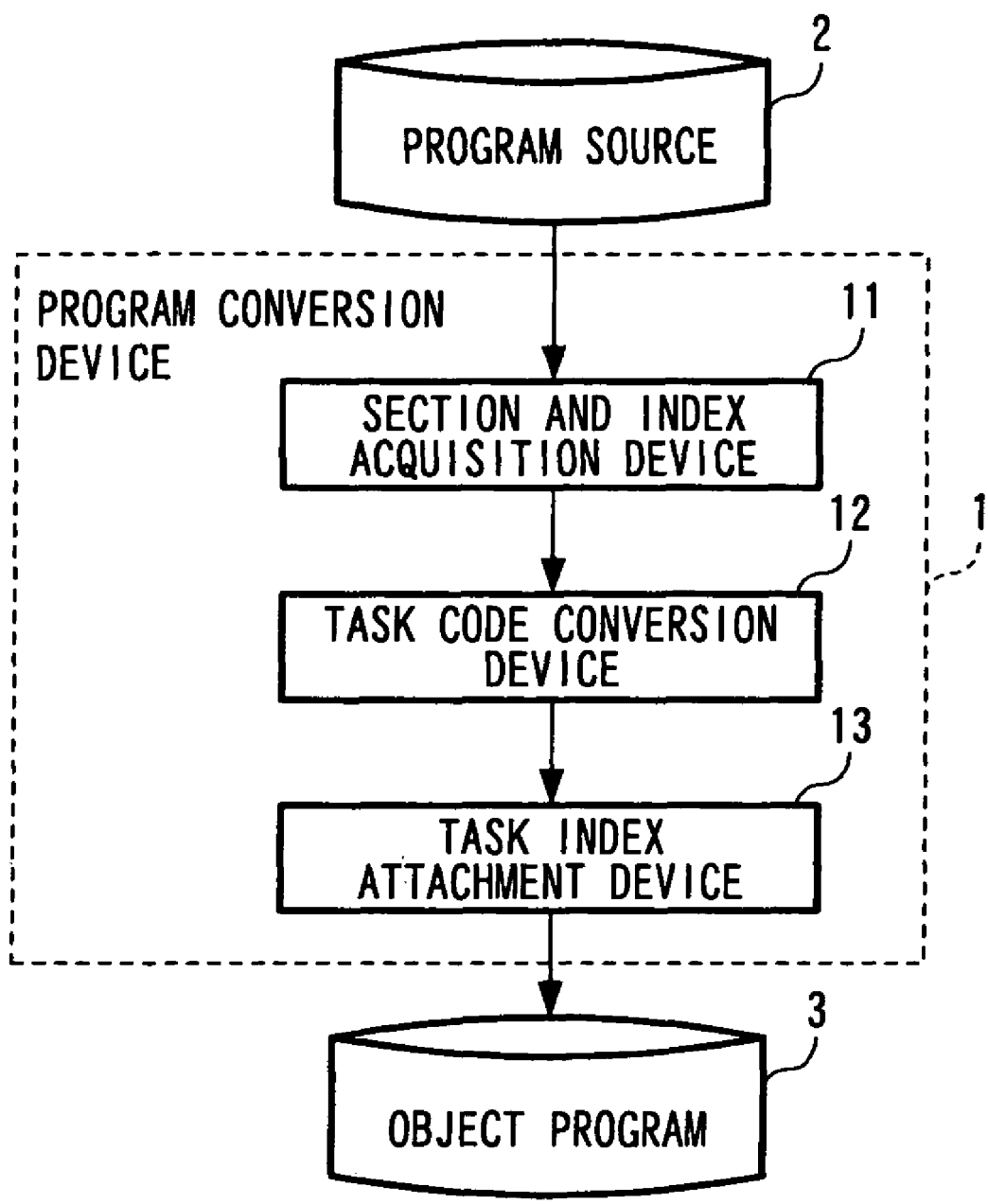
FIG. 1 is a block diagram depicting the configuration of the first embodiment of the program conversion device according to the present invention.

FIG. 1 is a block diagram depicting the first embodiment of the program conversion device of the present invention. This program conversion device 1 is comprised of a section and index acquisition device 11, task code conversion device 12, and task index attachment device 13.

1. Section and Index Acquisition Device 11

A program written in C language as shown in FIG. 2 will now be described as an example of the program source 2 to be input. The present invention however shall not specify language and syntax.

The section and index acquisition device 11 performs lexical analysis of the program source which was input, detects a predetermined reserved word, then acquires the attached index value. Here it is assumed that "#pragma", which indicates an indication line to the C language compiler, is used, and the reserved word is "_PERFORM". If the program source in FIG. 2 is input, the line "#pragma_PERFORM (numeric value)" is detected, and the numeric value "100" is acquired as the index value.

Then the section from "{"to the corresponding"}" after the detection line is detected, and the code of this section is acquired as the performance assurance code.

2. Task Code Conversion Device 12

The task code conversion device 12 shown in FIG. 1 converts the input program source 2 based on the information acquired by the section and index acquisition device 11, and outputs the object program 3.

The program shown in FIG. 3A is assumed to be a program source before being converted by the task code conversion device 12. Here the performance index value "100" and the performance assurance code 41 are acquired by the section and index acquisition device 11.

Figure 4:
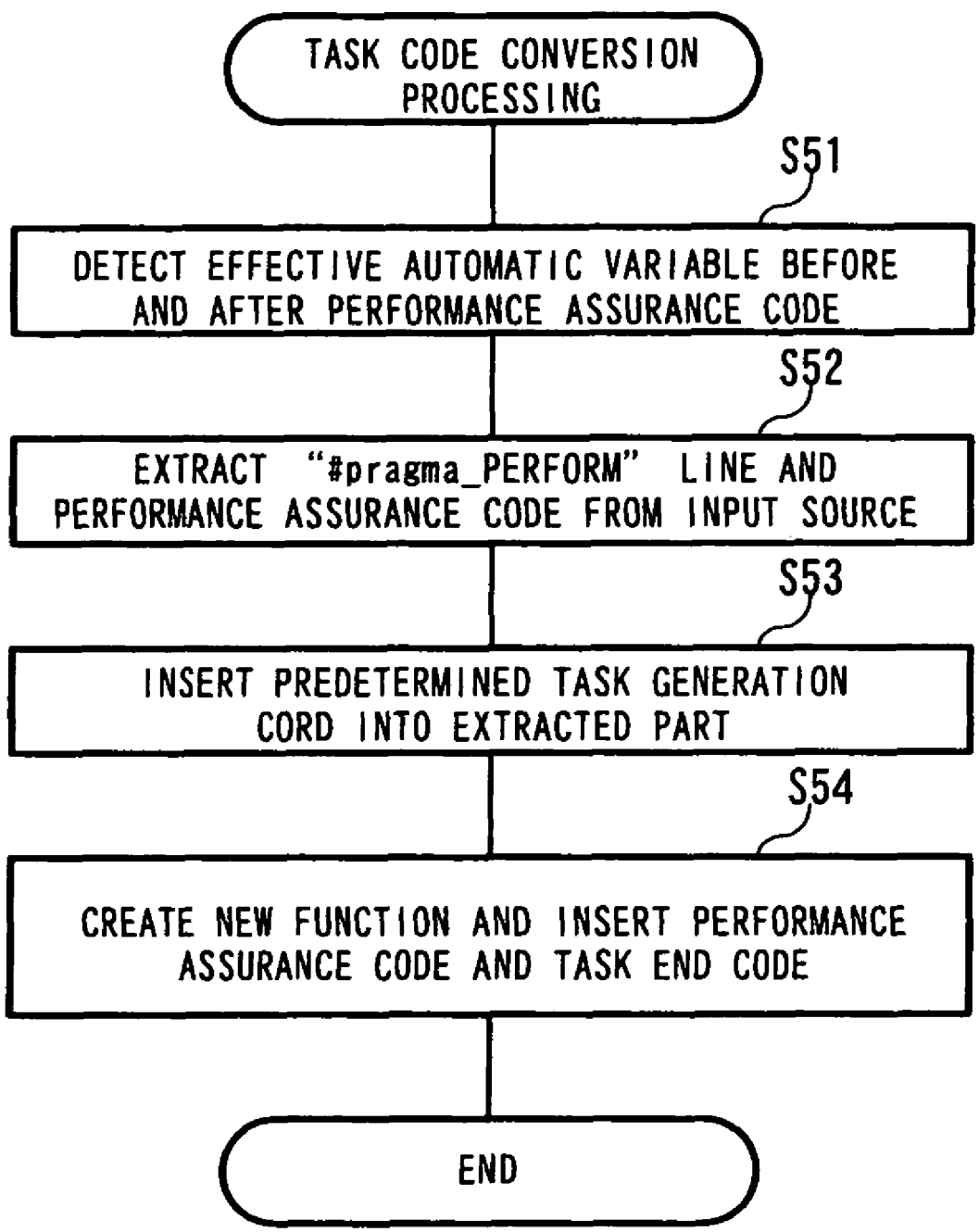
FIG. 4 is a flow chart depicting the operation of the task code conversion device in the program conversion device in FIG. 1.

FIG. 3B and FIG. 3C show the program source after being converted by the task code conversion device 12. The steps of the conversion will be described with reference to the flow shown in FIG. 4.

First an effective automatic variable is detected between code X and the performance assurance code 41 in FIG. 3A, and in the same way, an effective automatic variable is detected between the performance assurance code 41 and code Y (step S51). The effective range of these variables change when separated as tasks, so transfer is required between the function before separation and task function after separation.

Then the "#pragma_PERFORM (numeric value)" line and the performance assurance code 41, which the section and index acquisition device 11 in FIG. 1 detected, are deleted from the input source in FIG. 3A (step S52).

In this deleted portion (between code X and code Y), the prepared task generation code 42 (FIG. 3B) is inserted (step S53).

Finally a new function is created as shown in FIG. 3C. The function name 45 is assumed to be a unique one so as not to overlap. In this function, the performance code 41, task start code 43 and task end code 44 are inserted (step S54).

In the case of the conversion example in FIG. 3B, the task generation code 42 has the following configuration. It is assumed that the allocated time value described here is not the already acquired performance index value "100", but is a value acquired by the task index attachment device 13. For this, a constant label "_QTM_", which is a tentative value, is described here.

First the automatic variable detected in step S51 is saved "from code X to the performance assurance code 41" (42a).

Then the allocated time value (constant_QTM_) is added to the total of the time allocated at the moment (variable cur_time) (42b). If the result exceeds the maximum value (variable max_time) which is preset, error processing is performed, and task separation is not performed (42c). For the variable which may be shared by tasks, exclusion control processing is performed if necessary.

If no error occurs, a task is generated. The attribute of the task is initialized (42d), and the allocated time value which is provided to the task as the attribute is set (42e).

Then using this attribute, a task is generated by the "task_create" function (42f). The function name created in step S53 is specified here.

At this point the task has acquired the allocated time and started execution, so in the rest of the section the program waits until the generated task ends and joins by the "task_join" function (42g)

When the task ends and error processing completes, the allocated time value of the task is subtracted from the total of the allocated time (42h), and the automatic variable detected in step S51 is returned "from performance assurance code 41 to code Y" (42i).

The task start code 43 shown in FIG. 3C includes the return code 43a of the automatic variable "from code X to performance assurance code 41" detected in step S51, and the task end code 44 includes the return code 44a of the automatic variable "from performance assurance code 41 to code Y" detected in step S51 and the "task_exit" function 44b which declares the end of the task.

3. Task Index Attachment Device 13

The task index attachment device 13 in FIG. 1 calculates the allocated time of the task based on the acquired performance index value "100", and defines the actual value in the label "_QTM_" which is set as above in the task code conversion device 12.

The allocated time is calculated based on the acquired performance index value. In this first embodiment, it is assumed that the performance index value is "a performance value to indicate the number of instructions that can be processed per second".

Figure 5:
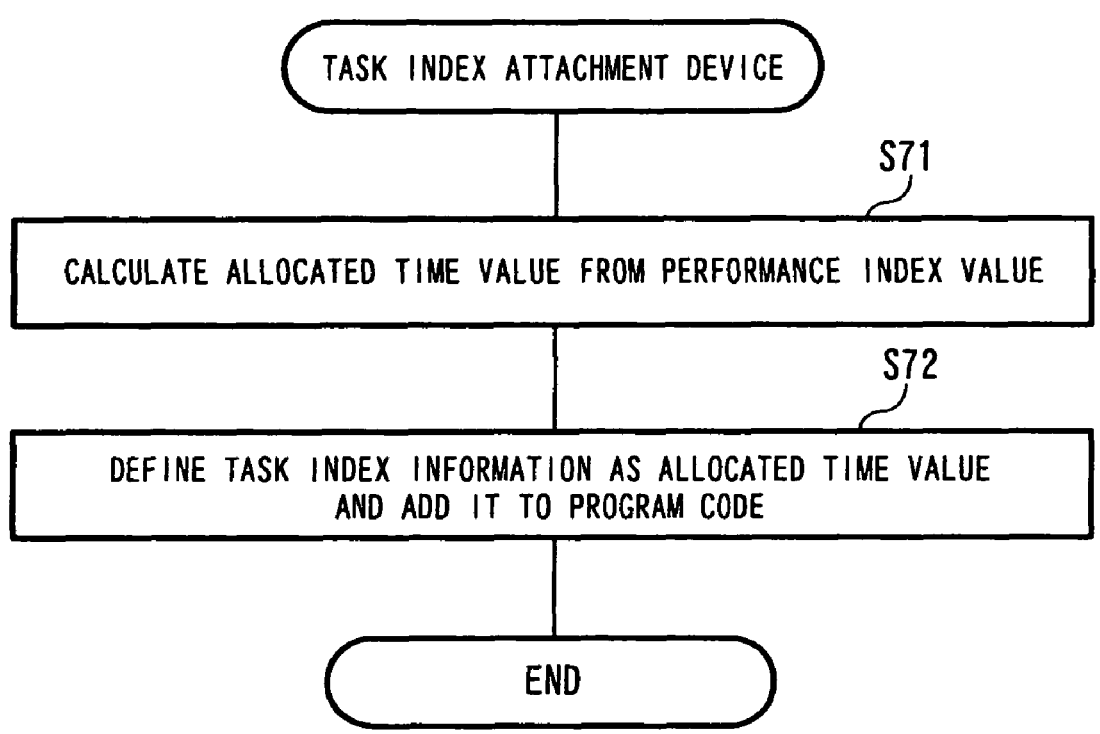
FIG. 5 is a flow chart depicting the operation of the task index attachment device in the program conversion device in FIG. 1.

In the task index attachment device 13, the actual allocated time is calculated from the performance index value according to the flow in FIG. 5 (step S71), and the program code 61 including the task index information and the declaration of the external reference variable as shown in FIG. 6 is added to the program code converted by the task code conversion device 12 (step S72).

In the program code 61, an actual value of the constant _QTM_, which is an allocated time value defined by the task index attachment device 13 in FIG. 1, is defined (61a). Since the performance index value is "a performance value to indicate the number of instructions that can be processed per second", "performance index value÷processor frequency× maximum allocated time value" becomes the value of _QTM_ because this processor performs the processing of one instruction in one step.

The processor frequency cpu_freq and the maximum allocated time value max_time are only declarations here (61b, 61c), and actual values must be preset when the entire program starts. The value of the total allocated time cur_time currently being held is also only a declaration (61d), and must be initialized in advance when the entire program is started.

The performance index value may be a "value to indicate the ratio of performance to full performance". In other words, if 30% performance is provided to the specified section, then a value of 0.3 or 30 is specified. In this case, the allocated time value is calculated by "performance index value (ratio)× maximum allocated time value", and the processor frequency cpu_freq is unnecessary.

According to the first embodiment, the program operates as an independent task when a specified section of the program is executed, so performance of the specified section can be assured without affecting other processing.

Second Embodiment

Now the second embodiment of the program conversion device of the present invention will be described.

The second embodiment has the same configuration as the first embodiment, where the task code conversion device 12 is replaced with another configuration.

1. Section and Index Acquisition Device 11

In the second embodiment, the section and index acquisition device 11 has the same configuration as that of the first embodiment, therefore a detailed description thereof is omitted.

2. Task Code Conversion Device 12

The task code conversion device 12 converts the input program source 2 shown in FIG. 1 based on the information acquired by the section and index acquisition device 11, and outputs the program.

FIG. 7A shows the program source before being converted by the task code conversion device 12. The performance index value "100" and the performance assurance code 81 are acquired by the section and index acquisition deice 11.

Figure 8:
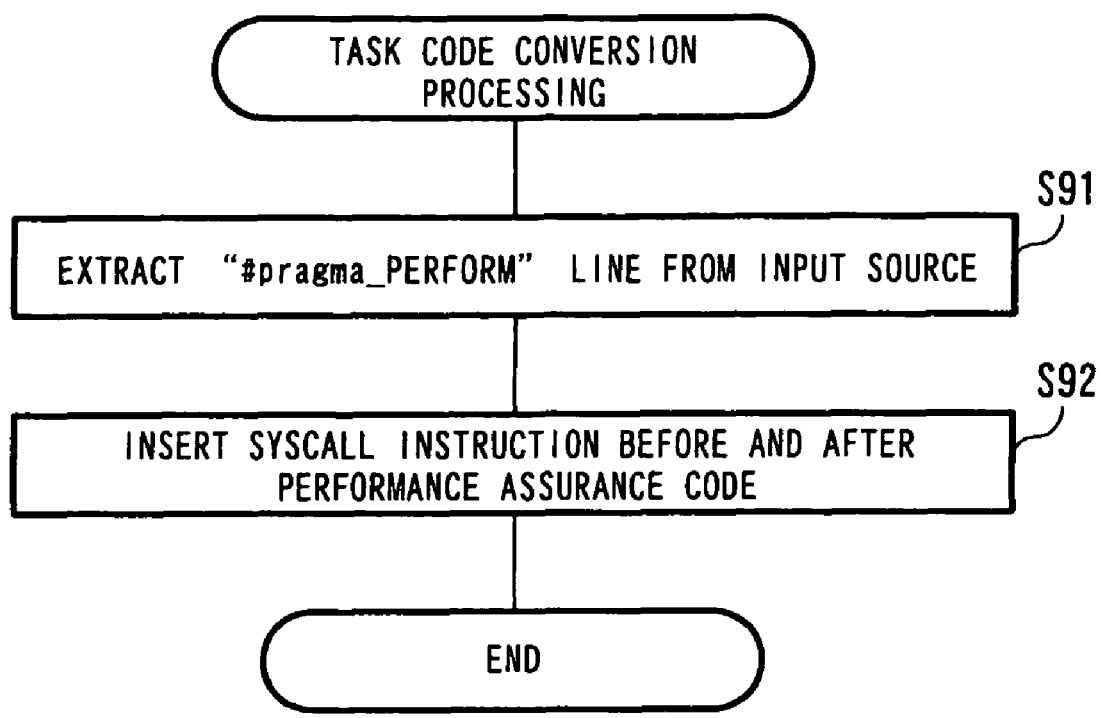
FIG. 8 is a flow chart depicting the operation of the task code conversion procedure according to the second embodiment in the program conversion device of the present invention.

FIG. 7B shows the program source after being converted by the task code conversion device 12. The conversion steps will be described with reference to the flow in FIG. 8.

First the "pragma_PERFORM (numeric value)" line detected by the section and index acquisition device 11 is deleted from the input source (step S91).

Then the syscall instruction is inserted before and after the detected performance assurance code 81 (step S92). The syscall instruction handled here calls up the scheduler function, and an actual function is processed in the scheduler. The actual function contents will be described in the later mentioned section on the scheduler.

The definition label_QTM_, which indicates the performance index value, is provided to the syscall instruction 82 to be inserted before the performance assurance code 81 as an argument (operand), and −1, which does not indicate any performance index value, that is which indicates the end of the section, is provided to the syscall instruction 83 to be inserted after the performance assurance code 81 as an argument (operand). Here there is a required condition that the performance index value does not use the value −1.

3. Task Index Attachment Device 13

In the second embodiment, the task index attachment device 13 has the same configuration as that of the first embodiment, therefore a detailed description thereof is omitted.

According to the second embodiment, only the insertion of a specific processor instruction to the program to be applied is required, and the codes related to the generation and the ending of the task can be completely separated from the program, so a program can be created without depending on the functions and format of the operating system.

Third Embodiment

The program conversion device of the third embodiment will now be described.

The third embodiment as well has the same configuration as the first embodiment, just like the case of the second embodiment. Here the section and index acquisition device 11 and the task code conversion device 12 are expanded so as to convert the program into a plurality of tasks which operate in parallel.

1. Section and Index Acquisition Device 11

Here a program described in C language, as shown in FIG. 9, will be described as an example of the program source 2 to be input (FIG. 1).

The section and index acquisition device 11 performs the lexical analysis of the program source which were input, and acquires an attached performance index value after detecting a predetermined reserved word.

If the program source shown in FIG. 9 is input, the line "pragma_PERFORM (numeric value, symbol)" is detected, the section from "{" to the corresponding "}" after the detected line is detected, and the performance index value and code of this section are acquired as the performance assurance code. If "#pragma_PERFORM (numeric value, symbol)" is still active and the symbol is the same, the performance index value and the performance assurance code are sequentially acquired.

However no code should be included between these performance assurance codes, that is between the end symbol "}" and the next "#pragma_PERFORM (numeric value, symbol)". Because according to the third embodiment, the parallel execution of two or more codes must be assured, and if a code is inserted between, a time based sequential relationship is generated.

Only one performance assurance code, of which performance index value is 0, may be included. This is executed in parallel with other codes as a code which does not assure performance.

2. Task Code Conversion Device 12

The task code conversion device 12 converts the input program source 2 and outputs the object program 3 based on the information acquired by the section and index acquisition device 11.

It is assumed that the program shown in FIG. 10A is a program source before being converted by the task code conversion device 12. By the section and index acquisition device 11, the performance index value "100" and the performance assurance code (A) indicated by the reference number 101, the performance index value "200" and performance assurance code (B) indicated by the reference number 102, and the performance index value "0" and the normal code (C) indicated by the reference number 103 have been acquired.

FIG. 10B and FIG. 10C show the program source after being converted by the task code conversion device 12. The conversion steps will be described with reference to the flow in FIG. 11.

The automatic variable detection in the first embodiment is not performed here. This is because when a plurality of codes operate in parallel, the automatic variable cannot be returned to the original value after being distributed to each code and executed. Therefore in this case, it is assumed that the normal code can be used as an automatic variable.

Figure 11:
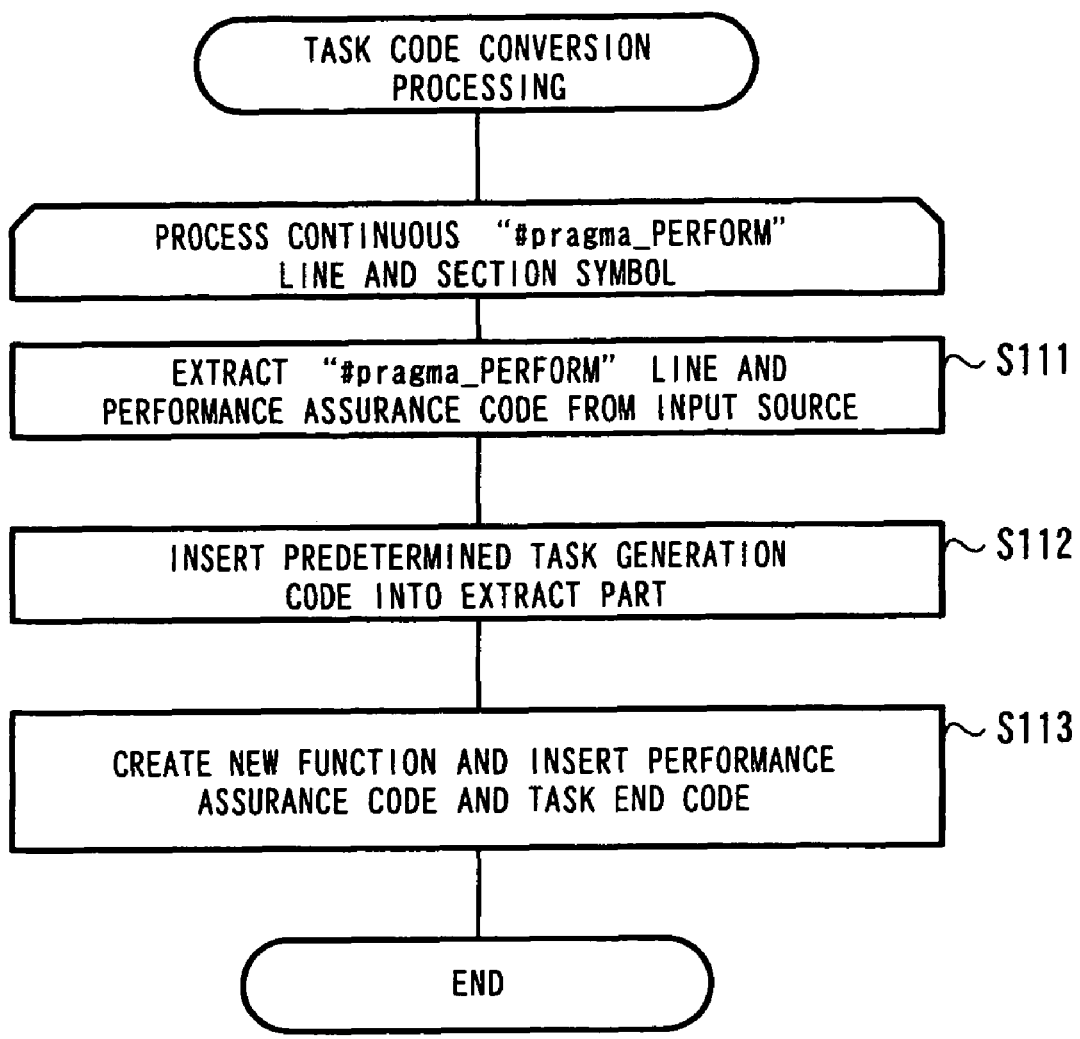
FIG. 11 is a flow chart depicting the operation of the task code conversion procedure according to the third embodiment of the program conversion device of the present invention.

In FIG. 11, the "#pragma_PERFORM (numeric value, symbol)" line and the performance assurance code 101 detected by the section and index acquisition device 11 are deleted from the input source in FIG. 10A (step S111). By repeating this for the number of detected lines, the performance assurance code (B) 102 and the normal code 103 are also deleted respectively.

In this deleted portion (between code X and code Y), a prepared task generation code 104 is inserted (step S112).

Finally a new function is created for the number of detected lines, as shown in FIG. 10C. The function, however, is not created for a normal code. The function name 106 is assumed to be unique so as not to overlap. In this function, the performance assurance code 101 or 102 and the task end code 105 are inserted (step S113).

In the case of the conversion example in FIG. 10B, the task startup code 104 has the following configuration. For the allocated time value described here, the constant labels "_QTMA_" and "_QTMB_" are described respectively corresponding to the performance assurance codes (A) and (B).

First processing to add the sum of the allocated time values (_QTMA_+_QTMB_) to the total (variable cur_time) of the currently allocated time is performed (104a). If the result exceeds the maximum value (variable max_time) which is preset, error processing is performed, and the task separation is not performed (104b). For the variable which may be shared by tasks, exclusion control processing is performed if necessary.

If no error occurs, a task is generated. The attribute of the task is initialized (104c), and the allocated time value which is provided to the task as the attribute is set (104d).

Then using this attribute, a task is generated by the "task_create" function (104e). The function name created in step S113 is specified here.

Then for the setting of the allocated time value and generation of the task, lines are added for the number of detected lines (104f).

The task has secured the allocated time and started execution at this point, and normal code 103 is executed if any, in the rest of this section (104g). When the code ends, the program waits until all the generated tasks end and join by the "task_join" function (104*h*). There is no need for the program to wait this function if all the tasks have already ended.

When the tasks end and error processing completes, the allocated time value of all the tasks is subtracted from the total of the allocated time (104*i*).

The task end code 105 includes the "task_exist" function to declare the end of a task.

By this configuration, a plurality of tasks holding the allocated time value can be executed in parallel.

3. Task Index Attachment Device 13

In the third embodiment, the task index attachment device 13 has the same configuration as that of the first embodiment, so detailed description is omitted.

According to the third embodiment, continuous section specifications and corresponding performance index information can be converted into a plurality of tasks which operate in parallel by a series of processings.

Fourth Embodiment

The scheduler according to the fourth embodiment of the present invention will be described.

Figure 12:
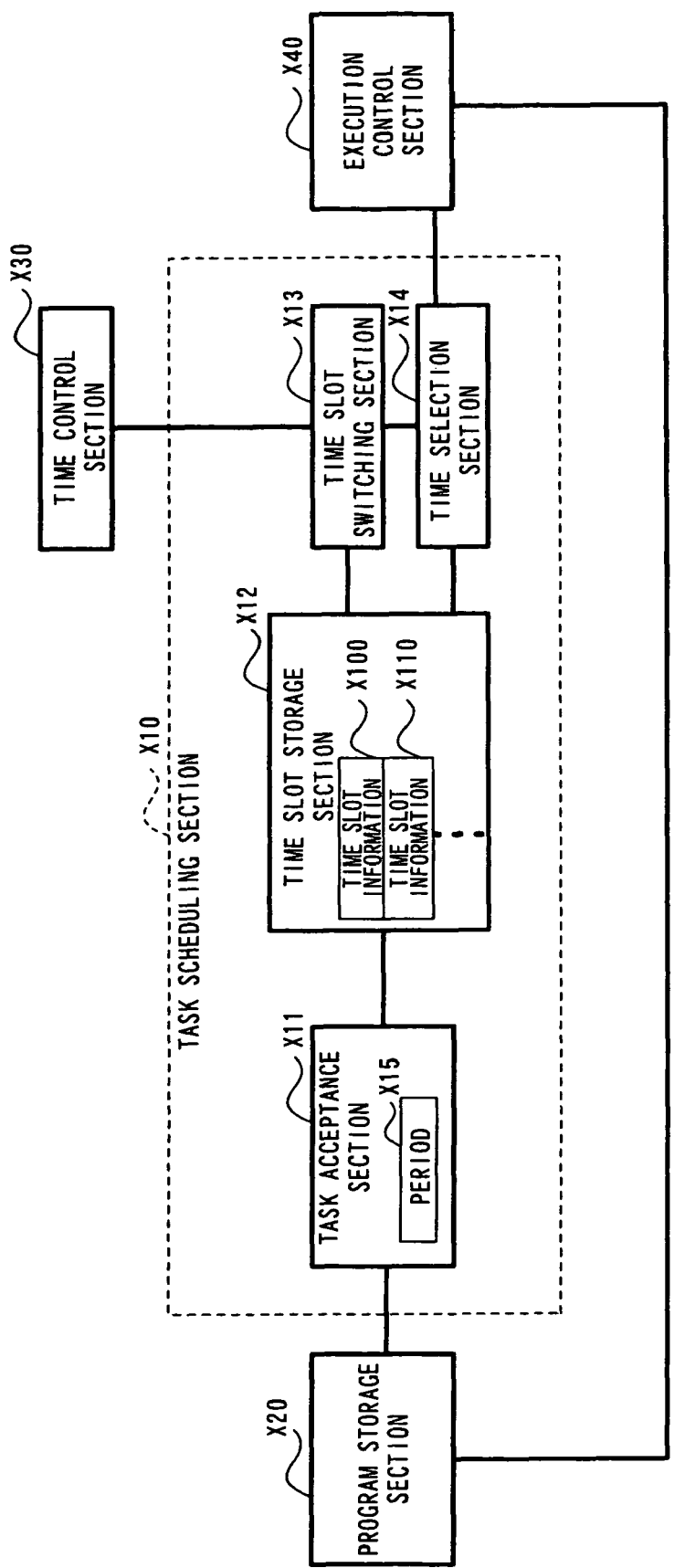
FIG. 12 is a block diagram depicting the configuration of the scheduler according to the fourth embodiment of the present invention.

FIG. 12 is a block diagram depicting the program execution device including the scheduler according to the present invention and peripheral devices thereof. This program execution device comprises a time scheduling section, that is scheduler X10, a program storage section X20, a time control section X30, and an execution control section X40. Now the scheduler X10 will be described.

The time scheduling section, that is the scheduler X10 comprises a task acceptance section X11, time slot storage section X12, time slot switching section X13, and task selection section X14.

The time slot is the time to execute the program by CPU, which is delimited at a predetermined time. By connecting the time slot and a task, the task can be executed only during this time.

1. Task Acceptance Section X11

The task acceptance section X11 accepts a task generated according to an instruction from a user program, and outputs this task to the time slot storage section X12 so as to become an object of scheduling. The information which is output to the time slot storage section X12 is the task information and the allocated time which are read from the program storage section X20.

The task information includes the program start address and the stack pointer. The program start address is the first address of the area where a task is written. The stack pointer is a position information for temporarily recording the status of the task when task switching occurs.

The allocated time is a value which is set as the allocated time of the time slot corresponding to the task when the task is accepted, and a value when the performance index information is converted by the program conversion device of the first, second or third embodiment is set. The task acceptance section X11 internally has an area X15 for holding the cycle value, and can hold this cycle value when a cycle is input.

2. Time Slot Storage Section X12

Figure 13:
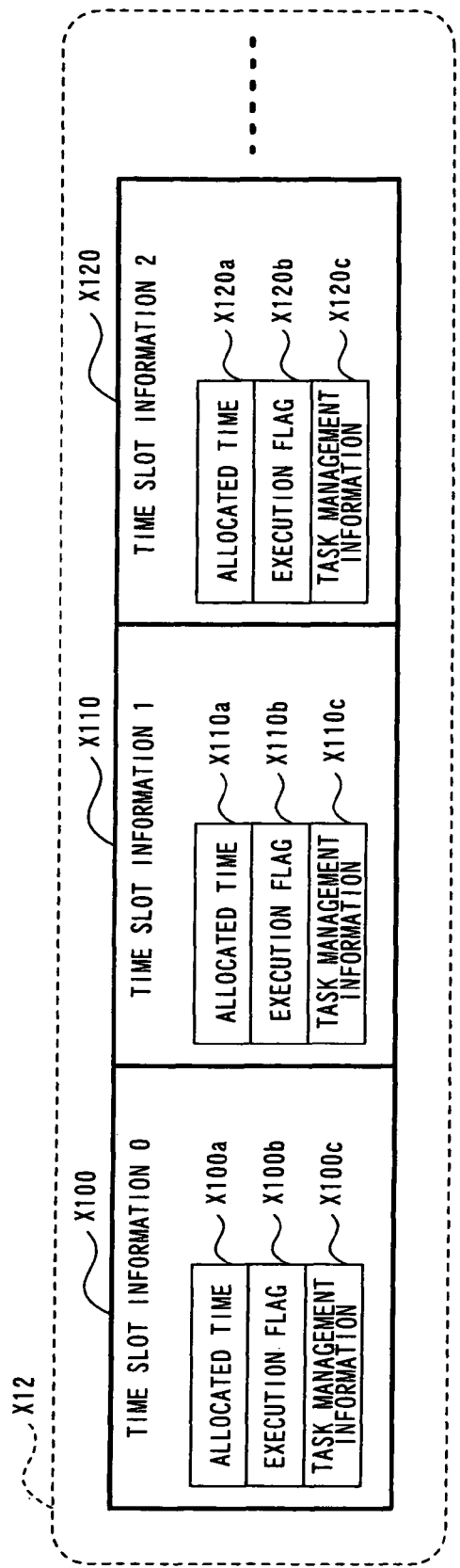
FIG. 13 is a block diagram depicting the configuration of the time slot storage section in the scheduler in FIG. 12.

The time slot storage section X12 is for managing the time slot information X100, X110, . . . as shown in FIG. 13.

The time slot information X100 includes information on the time slot, and includes specifically the allocated time X100*a*, flag X100*b* and task management information X100*c*.

The allocated time X100*a* is set at the same time with the generation of a time slot, and indicates the time for the task corresponding to this time slot to execute, and if this time elapses, processing to switch to the next time slot is performed.

The execution flag X100*b* is a binary integer to indicate whether this time slot is effective.

The task management information X100*c* holds the management information to manage the task, and one task information block indicates one task. This task management information X100*c* includes the program start address and the stack pointer, and when a task is generated, the task information, which is input by the task acceptance section X11, is held. When the task is switched, the execution address of the interrupted task and the stack pointer at this point are held.

The time slot information X110 and X120 also include the allocated times X110*a* and 120*a*, the execution flags X110*b* and X120*b*, and the task management information X110*c* and X120*c* respectively.

3. Time Slot Switching Section X13

When the execution time of the task connected to the time slot exceeds the allocated time, the time slot switching section X13 switches the time slots. Whether the allocated time has elapsed or not is notified by the timer control section X30, and the time slot to be used next is selected based on this information. In the fourth embodiment, it is assumed that the time slot information is arrayed in the sequence of the time slot information X100, time slot information X110, . . . Therefore the time slot to be selected next is determined by the sequence of the array, and the allocated time is acquired from the determined time slot information, and is set in the time control section X30.

4. Task Selection Section X14

The task selection section X14 saves the information on the currently executing task to the time slot storage section X12 when the time slot switching section X13 is switching or according to an instruction from the currently executing program, fetches the information on the task to be executed next from the task storage section X12, and outputs it to the execution control section X40.

<Details on Processing>

Now the details of the processing in the scheduler of the fourth embodiment will be described in the sequence of scheduling processing, task addition processing and task end processing.

1. Scheduling Processing

Figure 14:
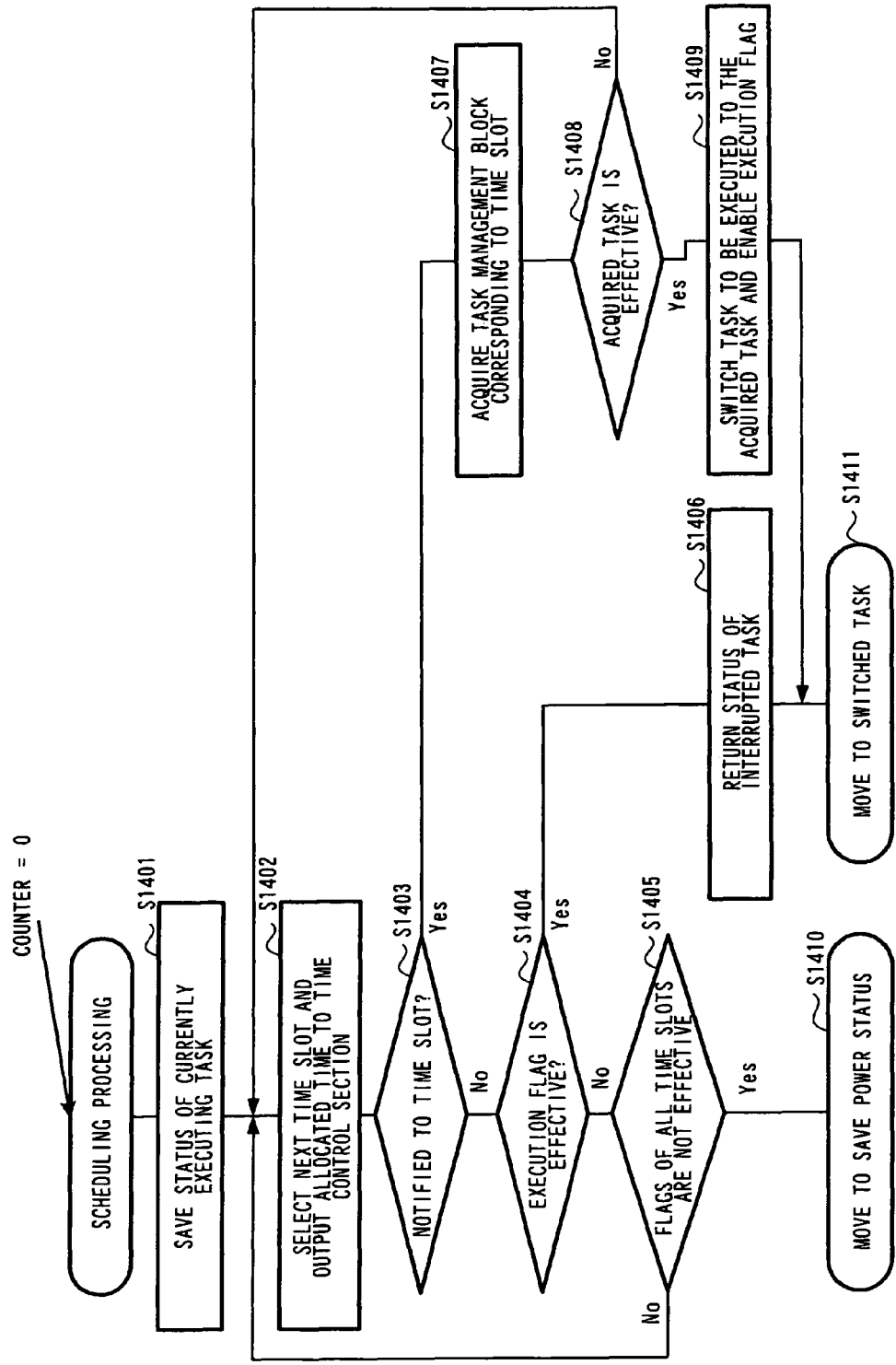
FIG. 14 is a flow chart depicting the scheduling processing procedure in the scheduler in FIG. 12.

The scheduling processing will be described with reference to the flow chart in FIG. 14. When the time being set elapses, a signal is sent from the time control section X30 to the time slot switching section X13, and scheduling processing starts.

First the status of the currently executing task is stored in the task management block (step S1401).

Then the time slot switching processing is performed. The element next to the currently selected element in the time slot information array is assumed to be the time slot information to be selected next. If there is no next element, the first element of the time slot information array is selected. The allocated time included in the selected time slot information is fetched and is output to the time control section X30. After this allocated time elapses from this point, a signal is sent again from the time control section X30 (step S1402).

The time slot has a mechanism to receive a notice, and if the notice is not received (step S1403), the pointer to the task management block included in the selected time slot information indicates the task to be executed next. If the execution flag held by the time slot is invalid (step S1404), this means that there is no task to be executed in this time slot, so the time slot is switched to the next time slot, and the same processing is executed until a valid time slot is found (step S1405).

If a valid time slot is not found, the processor shifts to power save status since there is no task to be executed (step S1410).

If there is a valid time slot (step S1404), the status of the time being interrupted, out of the tasks corresponding to this time slot, is returned, and execution is restarted (steps S1406 and S1411).

As described above, the time slot has a mechanism to receive a notice, and if a notice is sent to this time slot (step S1403), the task connected to the pointer of the time slot information is acquired (step S1407).

If the acquired task exists and can be executed (step S1408), execution is switched to this task, and execution of the task is restarted (steps S1409, S1411). If the acquired task is invalid, the time slot is switched to the next time slot (step S1402). By this series of processings, appropriate scheduling can be performed.

2. Task Addition Processing

Figure 15:
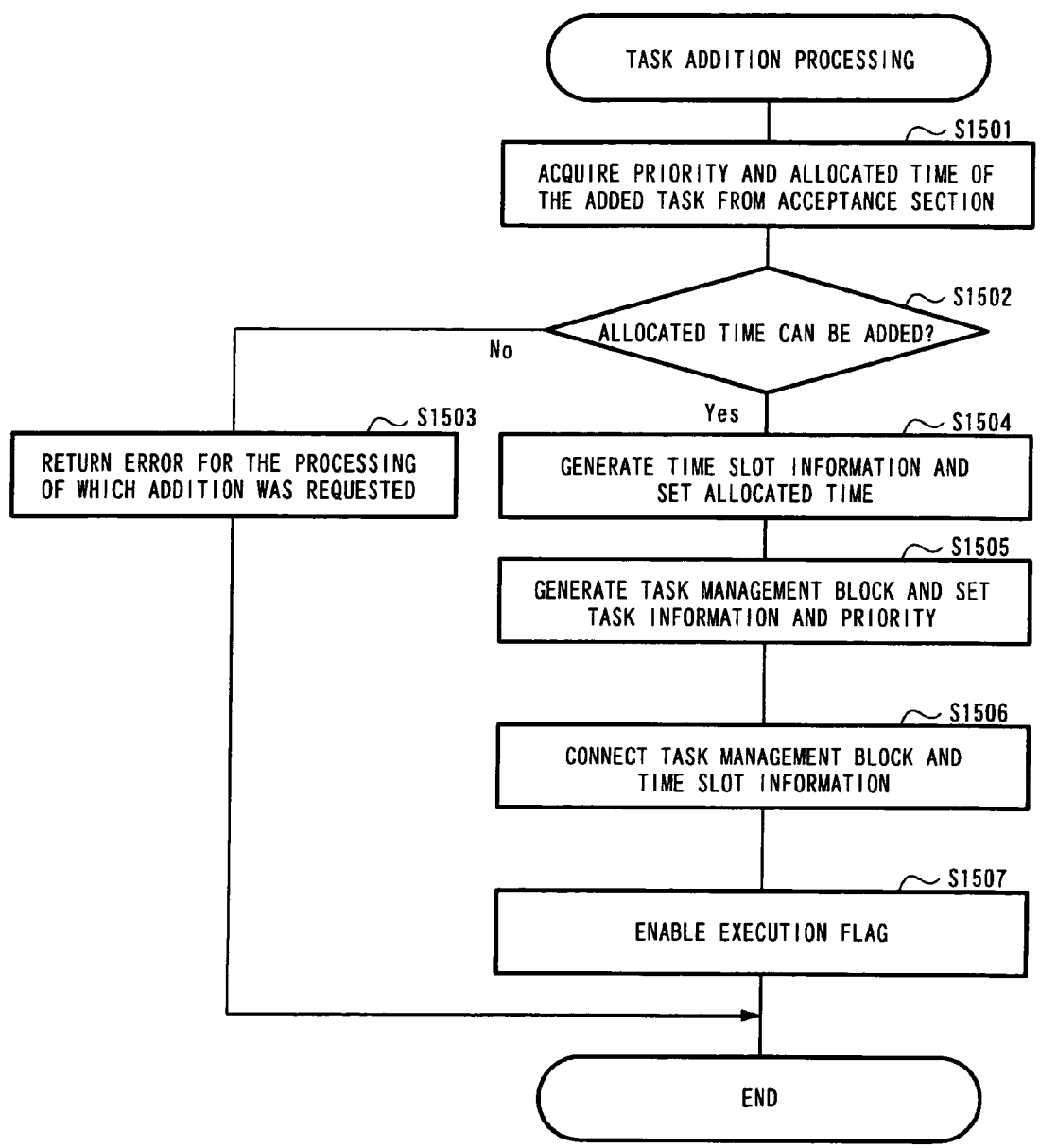
FIG. 15 is a flow chart depicting the task addition procedure in the scheduler in FIG. 12.

The task addition processing will be described with reference to the flow chart in FIG. 15.

The task addition request is generated either by the task addition function "task_create" or by the syscall instruction. Receiving this request, the allocated time of the task to be added is acquired from the task acceptance section X11 (step S1501).

Then whether adding the time slot is possible is checked. The cycle value which is input in the area X15 in advance has been held in the task acceptance section X11, and if the total of all the time slots is acquired from the time slot storage section X12 and the value when the allocated time value is added to this total value does not exceed the cycle value, then this is judged that adding the time slot corresponding to this task is possible (step S1502). If this cycle value is exceeded, an error is returned for the addition request (step S1503), and processing ends.

If this is judged that adding the time slot is possible in the step S1502, the time slot information is generated and the allocated time is set (step S1504).

The management block of the task to be executed on this time slot is also generated, and the task information is set (step S1505).

When the time slot information and the task management block are generated, the storage position of the time management block is set at the pointer of the time slot information to indicate the correspondence (step S1506).

Finally the execution flag of this time slot is enabled (step S1507).

By this series of processings, the task of which addition is requested can be added to an appropriate position according to the type.

3. Task End Processing

The task end processing is generated by the task end function "task_exit" or by the syscall instruction.

The task end processing only disables the execution flag included in the time slot information of this task, so that this task does not become a switching object of the time slot switching section X13.

According to the fourth embodiment, the time, according to the performance index, is allocated to the section code which has the performance index, and execution can be assured.

Fifth Embodiment

Now the development tool based on the fifth embodiment of the present invention will be described.

Figure 16:
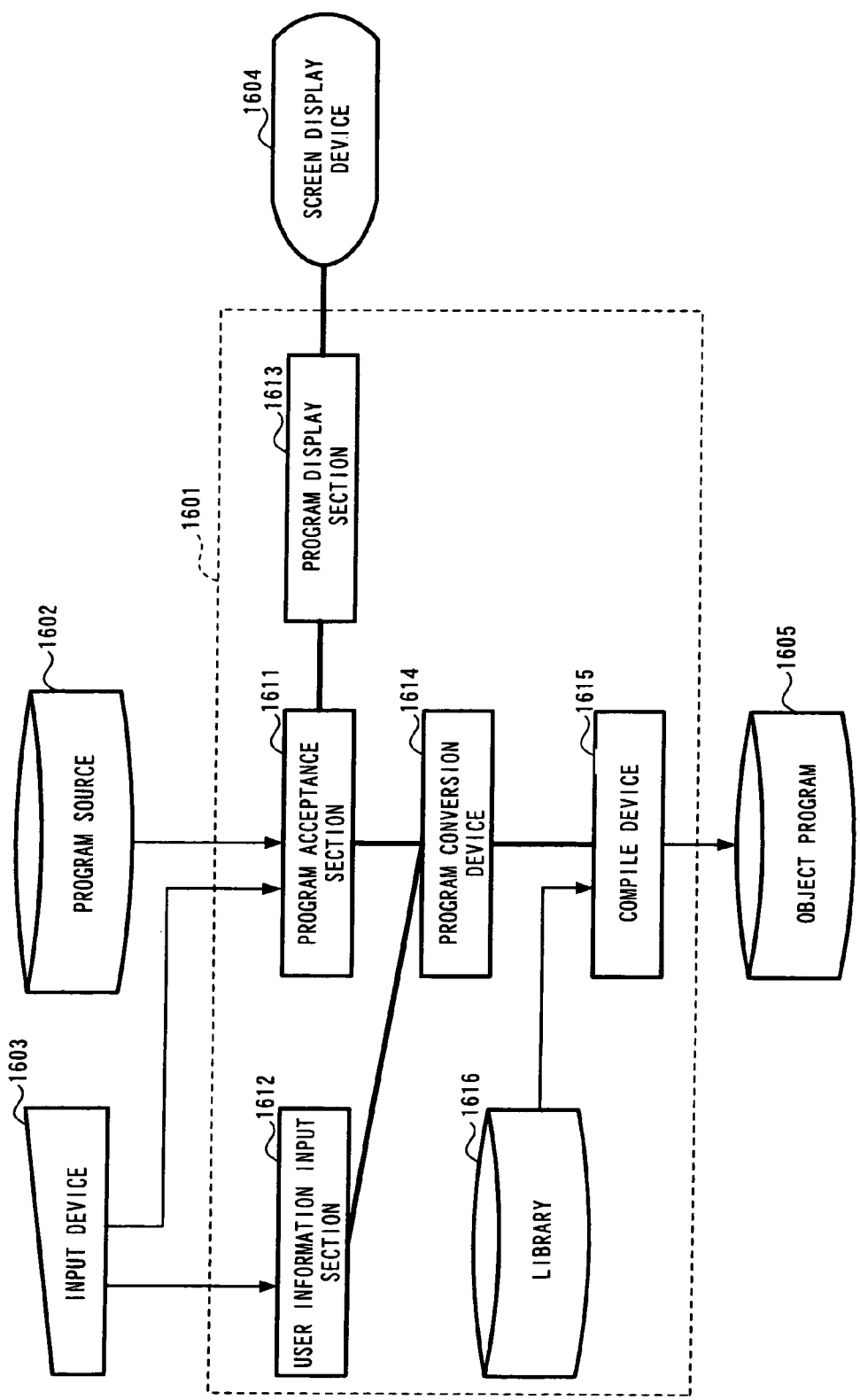
FIG. 16 is a block diagram depicting the configuration of the development tool based on the fifth embodiment of the present invention.

FIG. 16 is a diagram depicting the integrated environment using the above mentioned program conversion device. The integrated environment 1601 is comprised of the program acceptance section 1611, user information input section 1612, program display section 1613, program conversion device 1614, compile device 1615 and library 1616.

The program acceptance section 1611 accepts the input of the program source 1602 or directly accepts the input of the program using such an input device 1603 as a keyboard. The accepted program is displayed on the screen display device 1604 via the program display section 1613.

The user information input section 1612 accepts an operation to specify the range of a section of the program displayed on the screen display device 1604 using such an input device 1603 as a mouse. By this, the section of the program can be set. The user information input section 1612 also prompts the input of a value corresponding to the program section, and accepts the value which is input by the input device 1603.

The value and the program section accepted by the user information input section 1612 become the input of the program conversion device 1614, and the program from the program acceptance section 1611 is separated into tasks having a performance index value. The converted program is translated into machine language by the compile device 1615, joined with the library 1616, and is output as the object program 1605. The library 1616 may include the scheduler program.

According to the fifth embodiment, it is unnecessary to directly write an instruction line in the program to instruct the section and information, and performance indication and the section can be specified by an intuitive operation.

Sixth Embodiment

The information processing device based on the sixth embodiment will now be described.

Figure 17:
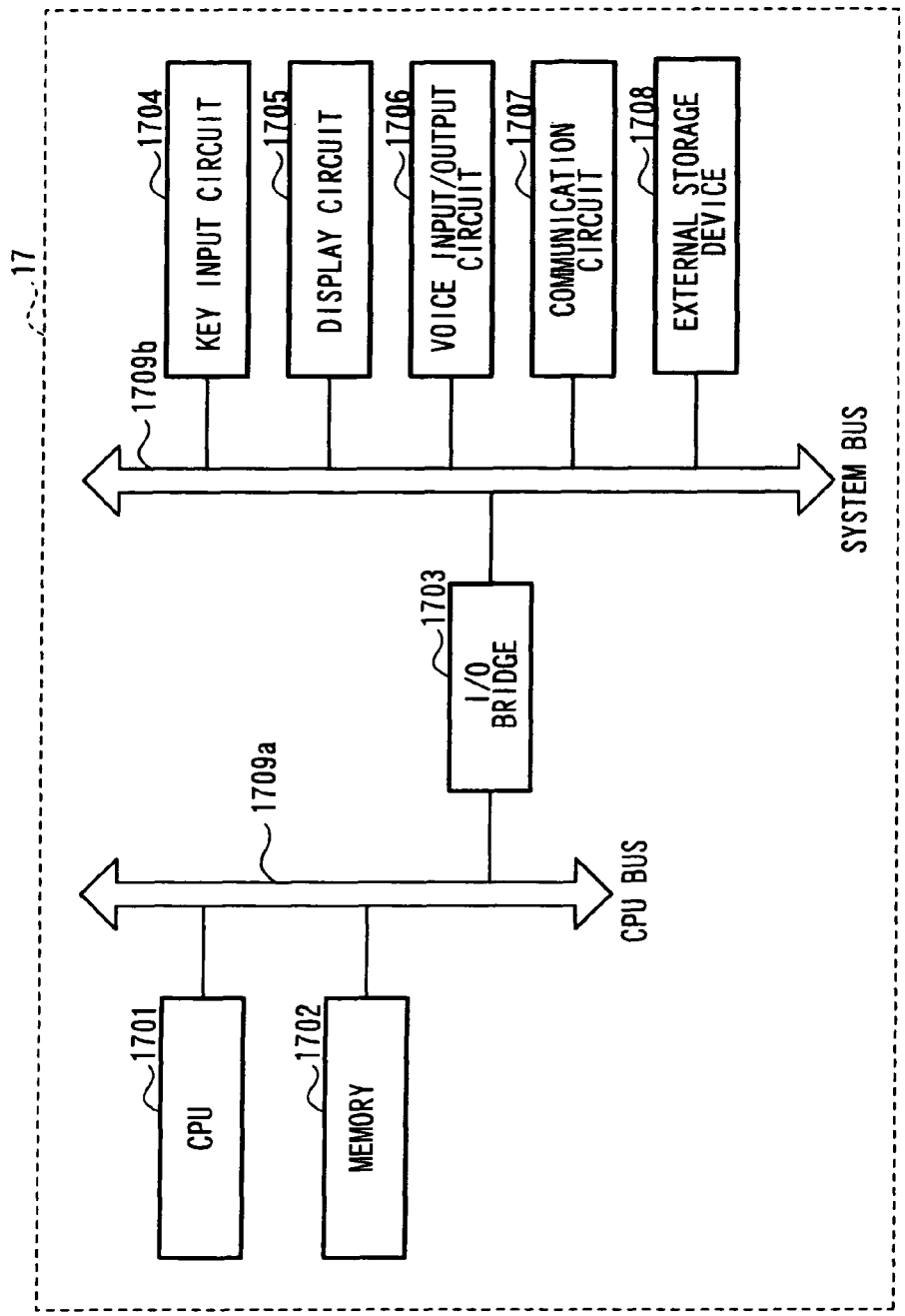
FIG. 17 is a block diagram depicting the configuration of the information processing device based on the sixth embodiment of the present invention.

FIG. 17 shows the information processing device including the object program converted by the program conversion device and the scheduler.

This information processing device 17 comprises the CPU 1701, memory 1702, I/O bridge 1703, key input circuit 1704, display circuit 1705, voice input/output circuit 1706, communication circuit 1707 and external storage device 1708.

The CPU 1701 and the memory 1702 are inter-connected via the CPU bus 1709a. The key input circuit 1704, the display circuit 1705, the voice input/output circuit 1706, the communication circuit 1707 and the external storage device 1708 are inter-connected via the system bus 1709b. The CPU bus 1709a and the system bus 1709b are interconnected via the I/O bridge 1703.

The CPU 1701 reads the program from the memory 1702, and decodes and executes it. If necessary, the CPU 1701 further reads data from the memory 1702, and writes the execution result to the memory 1702.

In the sixth embodiment, the object program converted by the program conversion device and the scheduler are recorded in the memory 1702, and these are executed by the CPU 1701.

By executing this object program and scheduler, the pre-specified section is executed according to the performance index.

If the image display processing, voice output processing and communication processing are included in this object program, these processings can be executed in real-time without affecting one another since each processing is executed according to the allocated time indicated by the performance index.

What is claimed is:

1. A program conversion device, stored in a computer processing unit, for converting a program source, comprising:
   a scheduler;
   a section and index acquisition device for acquiring a section code for indicating a section embedded in the program, and performance index information embedded in the program in association with the section code as a performance value to indicate the number of instructions that can be processed within a unit time;
   a task code conversion device for adding a designated task generation code and separating the acquired section code into task codes and adding a first code to indicate the beginning of a task and a second code to indicate the end of the task in the task code; and
   a task index attachment device for calculating allocated time of the task based on the performance index information and attaching the allocated time to the task generation code which is inputted to the scheduler, wherein
   the performance value is a value indicating a time ensuring processing performance of the section by the number of instructions when the section is parallel processed.

2. The program conversion device according to claim 1, wherein the task code conversion device adds a task start code as the first code to indicate the beginning of the task, and attaches a task end code as the second code to indicate the end of the task.

3. The program conversion device according to claim 1, further comprising a processor, wherein the task code conversion device attaches specific instructions of the processor as the first and second codes to indicate the beginning of the task and the end of the task.

4. The program conversion device according to claim 1, wherein the task code conversion device adds to the task generation code a code to operate such that an error is output when the program cannot be started up for the task generation code according to the attached index.

5. The program conversion device according to claim 1, wherein the task code conversion device detects whether a variable is reused at a boundary of a section code start point and at a boundary of a section code end point, and when the variable is reused, attaches a code to transfer the variable, from the code before starting the task to the separated task code, and transfers the variable from the code before ending the separated task code to the code after the task ends.

6. The program conversion device according to claim 1, wherein the section and index acquisition device acquires the performance index information along with a code to indicate a group, and
   the task code conversion device adds the task generation code for generating tasks in parallel when section codes having a same code to indicate a group are detected, and it is judged that the section codes do not have a dependency relationship.

7. A program development tool, comprising:
   a program acceptance device for accepting a program from the outside;
   a program display device for displaying an accepted program;
   a user information input device for receiving a section of the program displayed by the program display device and performance index information in association with this section, as input; and
   the program conversion device according to claim 1, for separating the program into tasks having performance index information based on the program accepted by the program acceptance device and a section of the program received by the user information input device and the performance index information in association with this section.

8. A scheduler, stored in a computer processing unit, for controlling the execution sequence of programs, comprising:
   a task performance index input device for inputting a task performance index, calculated from a performance value to indicate the number of instructions that can be processed within a unit time, from a task when a task generation code is detected;
   a scheduling device for scheduling all tasks according to the task performance index; and
   a task switching device in which the time required for allocating the task performance index to the execution of processing is set as the processing time and the execution is switched to another processable task when the processing time elapses, wherein
   the performance value is a value indicating a time ensuring processing performance of the section by the number of instructions when the section is parallel processed.

9. The scheduler according to claim 8, further comprising a processor, wherein the scheduling device starts or ends scheduling when the processor decodes a specific instruction.

10. An information processing device, comprising:
   a program code including a program converted into tasks attached with performance index by a program conversion device;
   a memory for storing a scheduler; and
   a processor for processing the program code and the scheduler, wherein the program conversion device comprises:
      a scheduler;
      a section and index acquisition device for acquiring a section code for indicating a section embedded in the program, and performance index information embedded in the program in association with the section code as a performance value to indicate the number of instructions that can be processed within a unit time;
      a task code conversion device for adding a designated task generation code and separating the acquired section code into task codes and adding a first code to indicate the beginning of the task and a second code to indicate the end of the task in the task code; and
      a task index attachment device for calculating allocated time of the task based on the performance index information and attaching the allocated time to the task generation code which is inputted to the scheduler
   wherein the scheduler comprises:
      a task performance index input device for inputting a task performance index from a task when a task generation code is detected;
      a scheduling device for scheduling all tasks according to the task performance index; and
      a task switching device in which the time required for allocating the task performance index to execution processing is set as the processing time, and the execution is switched to another processable task when the processing time elapses, wherein the performance value is a value indicating a time ensuring processing performance of the section by the number of instructions when the section is parallel processed.

11. A program conversion method for converting a program source, comprising:

- a section and index acquisition step for acquiring a section code for indicating a section embedded in the program, and performance index information embedded in the program in association with the section code as a performance value to indicate the number of instructions that can be processed within a unit time;
- a task code conversion step for adding a designated task generation code and separating the acquired section code into task codes and adding a first code to indicate the beginning of the task and a second code to indicate the end of the task in the task code; and
- a task index attachment step for calculating allocated time of task based on the performance index information and attaching the allocated time to the task generation code which is inputted to a scheduler, wherein
- the performance value is a value indicating a time ensuring processing performance of the section by the number of instructions when the section is parallel processed.

12. A program conversion device, stored in a computer processing Unit, for converting a program source, comprising:

- a scheduler;
- a section and index acquisition device for acquiring a section code for indicating a section embedded in the program, and performance index information embedded in the program in association with the section code as a value to indicate a ratio to the maximum performance value that can be processed;
- a task code conversion device for adding a designated task generation code and separating the acquired section code into task codes and adding a first code to indicate the beginning of the task and a second code to indicate the end of the task in the task code; and
- a task index attachment device for calculating allocated time of task based on the performance index information and attaching the allocated time to the task generation code which is inputted to the scheduler, wherein
- the performance value is a value indicating a time ensuring processing performance of the section by the ratio to the maximum performance value that can be processed when the section is parallel processed.

* * * * *